United States Patent
Myoung et al.

(10) Patent No.: US 7,076,165 B2
(45) Date of Patent: Jul. 11, 2006

(54) OPTICAL TRANSPONDER WITH ADD/DROP OPERATION FUNCTION OF OPTICAL CHANNELS

(75) Inventors: Seung Il Myoung, Daejon (KR); Hyun Jae Lee, Daejon (KR); Yun Hee Cho, Daejon (KR); Jyung Chan Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 693 days.

(21) Appl. No.: 10/195,913

(22) Filed: Jul. 15, 2002

(65) Prior Publication Data

US 2004/0208532 A1    Oct. 21, 2004

(30) Foreign Application Priority Data

Dec. 28, 2001  (KR) .............................. 2001-86486

(51) Int. Cl.
*H04B 10/08* (2006.01)

(52) U.S. Cl. ............................. 398/33; 398/83; 398/95; 398/196

(58) Field of Classification Search ................. 398/83, 398/46–49, 51, 53, 68, 79, 33, 95, 196
See application file for complete search history.

(56) References Cited

U.S. PATENT DOCUMENTS

| | | | |
|---|---|---|---|
| 5,383,046 A | | 1/1995 | Tomofuji et al. |
| 5,938,309 A | | 8/1999 | Taylor |
| 6,532,320 B1 | * | 3/2003 | Kikuchi et al. ................ 385/24 |
| 6,609,840 B1 | * | 8/2003 | Chow et al. ................. 398/102 |
| 2002/0186432 A1 | * | 12/2002 | Roorda et al. .............. 359/128 |
| 2002/0191250 A1 | * | 12/2002 | Graves et al. .............. 359/128 |

FOREIGN PATENT DOCUMENTS

KR  2001-0064019  7/2001

* cited by examiner

*Primary Examiner*—David C. Payne

(74) *Attorney, Agent, or Firm*—Blakely, Sokoloff, Taylor & Zafman

(57) ABSTRACT

The present invention provides an optical transponder with an add/drop operation function of optical channels, which combines operating functions of adding and dropping type optical transponders in accordance with mounting of a digital wrapper to simultaneously process two optical channels. The optical transponder receives an optical signal, converts the optical signal into electrical signal, adds maintenance information, monitoring information, and error correction information to each of the converted signals, and detects the maintenance information, monitoring information, and errors contained in each of the signals. Furthermore The optical transponder corrects the detected errors, and transmits the signals having the maintenance information, monitoring information, and error correction information and the signals of which errors are corrected.

7 Claims, 5 Drawing Sheets

OPTICAL TRANSPONDER WITH ADD/DROP OPERATION FUNCTION OF OPTICAL CHANNELS

BACKGROUND OF THE INVENTION

1. Field of the Invention

The present invention relates to an optical transponder in an optical transport system, and more particularly to an optical transponder with an add/drop operation function of optical channels, which combines operating functions of adding and dropping type optical transponders in accordance with mounting of a digital wrapper to simultaneously process two optical channels, thereby performing addition and detection of maintenance information and monitoring information and detecting errors generated during optical transfer of signals due to addition of error correction symbol signals, thereby recovering those signals

2. Description of the Related Art

Generally, optical transponders serve to transport signals received from an external transport network to an optical transport network, or to transmit signals received from the optical transport network to the external transport network. That is, such optical transponders serve as an access point between different transport networks while performing addition and detection of maintenance information and monitoring information of respective optical channel layers of optical signals received therein, in order to perform its maintenance and monitoring functions.

Also, such optical transponders are classified into those of an adding type which detects maintenance information and monitoring information contained in an optical signal transmitted from the external transport network, adds, to the optical signal, new maintenance and monitoring information suitable for operations of the external transport network, based on the detected result, and transmits the resultant optical signal, and those of a dropping type which detects maintenance information and monitoring information contained in an optical signal transmitted from a transport network, monitors the optical signal based on the detected information, adds, to the optical signal, new maintenance and monitoring information suitable for operations of the external network, based on the detected result, and transmits the resultant optical signal to the external network.

Thus, only one of the above mentioned two functions is performed by one optical transponder. Accordingly, it is necessary to use two optical transponders in order to perform both functions. This will be described in conjunction with FIG. 1.

FIG. 1 is a block diagram illustrating an optical transport system using typical optical transponders. Referring to FIG. 1, an optical signal transmitted from an optical transmitter 11 included in an external network (A) 10 is received by the adding type transponder part TPa of an optical transponder 211 included in an optical channel layer 21. The adding type transponder part TPa of the optical transponder 211 opto-electrically converts the received signal, detects maintenance information and monitoring information from the converted signal, performs desired maintenance and monitoring operations based on the detected information, adds, to the signal, maintenance information and monitoring information, electro-optically converts the resultant signal, and transmits the converted signal to an optical multiplexer 231 included in an optical multiplexing/demultiplexing layer 23. The optical channel layer 21 includes N optical transponders. In FIG. 1, only the first and N-th optical transponders are denoted by the reference numerals 211 and 212, respectively. Each optical transponder includes an adding type transponder part TPa and a drop type transponder part TPd. Thus, N optical signals respectively transmitted from the N optical transponders are multiplexed by the optical multiplexer 231 of the optical multiplexing/demultiplexing layer 23. The multiplexed signal outputted from the optical multiplexer 231 is amplified by an optical amplifier 251 included in an optical amplifier layer 25, and then transmitted via and optical line, that is, an optical fiber 26.

The optical signal transmitted via the optical fiber 26 is demultiplexed by an optical demultiplexer 241 included in an optical multiplexing/demultiplexing layer 24, so that it is split into signal components of different wavelengths respectively corresponding to different optical channels. Each of the split optical signals is opto-electrically converted by the drop type transponder part TPd of an associated optical transponder 221 included in an optical channel layer 22. The drop type transponder part TPd of the optical transponder 221 detects maintenance information and monitoring information from the optical signal, thereby performing maintenance and monitoring operations. Thereafter, the drop type transponder part TPd of the optical transponder 221 adds maintenance information and monitoring information to the optical signal, electro-optically converts the resultant optical signal, and transmits the converted optical signal to an external network (B) 30.

Meanwhile, signals transmitted from an optical transmitter 31 included in the external network (B) 30 are transmitted to an optical receiver 12 included in the external network (A) 10 after being processed through the same procedures as described above. As apparent from the above description, each transponder 211 or 221 of the optical channel layer 21 or 22 includes an adding type optical transponder part TPa, and a drop type optical transponder part TPd. That is, it is necessary to use two optical transponders respectively having optical adding and dropping functions in order to achieve both the optical adding and dropping operations.

FIG. 2 is a block diagram illustrating an optical transponder used in a conventional optical transport system. As shown in FIG. 2, the optical transponder includes an optical distributor 41, an optical receiver 42, a section overhead (SOH) processor 43, an optical transmitter 44, an optical detector 45, a monitoring signal detector 46, and a monitoring information processor 47.

An optical signal transmitted from an external network is received in the optical distributor 41 which branches the received optical signal. The branched optical signal is opto-electrically converted by the optical detector 45, so that it is converted into an electrical signal. From this electrical signal, signal components corresponding to maintenance and monitoring information added in the form of modulated low frequency components to the information signal are separated. Maintenance information and monitoring information are obtained from the separated signal, so that they are used for the maintenance and monitoring of the optical signal.

An overhead newly generated in the monitoring information processor 47 for maintenance and monitoring operations is applied to the SOH processor 43 arranged downstream from the monitoring information processor 47. The SOH processor 43 adds the signal modulated in the form of low frequency components by the monitoring signal processor 47 to the information signal received from the optical receiver 42.

As apparent from the above description, where the conventional optical transponder 40 is applied to an optical transport system, there is a problem in that it is necessary for the optical transponder to have two different transponder parts in order to obtain both optical adding and dropping functions. Furthermore, it is necessary to modulate the information signal in the form of low frequency components in order to allow the addition of maintenance information and monitoring information to the information signal. For this reason, the added information may act as noise in the information signal.

Various methods for detecting monitoring components from an optical signal have been proposed. For example, U.S. Pat. No. 5,383,046 discloses a supervisory and control signal transmitting system for use in an optically amplifying repeater system for amplifying light attenuated over a long distance between a transmitting station and a receiving station through a plurality of repeaters, and sub-carrier-converting supervisory information and control information in order to transmit those information in a state carried by an optical signal. This system includes a receiver, a supervisory information detector, a supervisory information processor, sub-carrier modulator, and an optical transmitter, in order to process supervisory signals through modulation of information signals. However, such a system has no function of correcting errors contained in information signals, currently transmitted, because signal detection and addition are performed only for the supervisory signals contained in optical signals being transmitted. Furthermore, it is difficult to achieve a desired maintenance for information signals. Where a transport network using the above mentioned system is constructed, it is necessary to construct two separate systems for maintenance and monitoring operations during the transmission of optical signals. In addition, there is a limitation on the transmission distance and transmission performance because the monitoring signals contained in optical information signals may act as noise.

Meanwhile, U.S. Pat. No. 5,938,309 discloses a wavelength division multiplexing (WDM) optical communication system with remodulators transmitting signals at different bit rates. This system performs multiplexing and demultiplexing operations for different optical signals to maintain the same transmission rate for those optical signals, thereby allowing combination of the signals. However, although this system achieves a change of transmission rate required to allow optical signals of different bit rates to be transmitted to an optical communication system at a transmission rate of 2.5 Gbps, it does not implement adding or dropping operations of maintenance and monitoring information contained in information signals. Furthermore, this system has no error correcting function. Since this system is unidirectionally used as an optical transmitter or an optical receiver, it has a problem in that it operates inefficiently in an optical transport network.

SUMMARY OF THE INVENTION

Therefore, the present invention has been made in view of the above mentioned problems, and an object of the invention is to provide an optical transponder with an add/drop operation function of optical channels, which combines operating functions of adding and dropping type optical transponders, performs addition and detection of maintenance information and monitoring information, and detects errors generated during optical transfer of signals due to addition of error correction symbol signals, thereby recovering those signals.

In accordance with the present invention, this object is accomplished by providing An optical transponder with an add/drop operation function of optical channels in an optical transport system connecting an external network and an optical transport network, comprising:

at least one opto-electrical converting means for receiving an optical signal as an input optical signal, and opto-electrically converting the received optical signal;

at least one demultiplexing means for demultiplexing the converted signal;

information adding means for adding maintenance information, monitoring information, and error correction information to each of demultiplexed signals outputted from the demultiplexing means;

detecting and correcting means for receiving the demultiplexed signals from the demultiplexing means, detecting the maintenance information, monitoring information, and errors contained in each of the demultiplexed signals, and correcting the detected errors;

at least one multiplexing means for receiving signals respectively outputted from the information adding means and the detecting and correcting means;

at least one optical transmitting means for transmitting a signal outputted from the multiplexing means as an output optical signal; and control means for generating a control signal for processing of the maintenance information and monitoring information, and correction of errors, applying the control signal to the detecting and correcting means, receiving the maintenance information, monitoring information, and error correction information from the detecting and correcting means, and signal-processing the received information.

The present invention relates to an optical transponder which receives an optical signal transmitted from one of two connected networks, that is, an external network or an optical transport network, converts the optical signal into an electrical signal, and electro-optically converts again the electrical signal so as to transmit that signal, while having functions of adding and detecting maintenance information and monitoring information for optical channel layers, and an error correcting function by virtue of addition and detection of an error correction symbol.

Such an optical transponder has both the optical channel adding and dropping type operation functions in accordance with mounting of a digital wrapper. This optical transponder may be used as a by-pass type transponder for the operation of optical transport networks. Since the optical transponder of the present invention has functions of operating maintenance information and monitoring information, and correcting errors, it is suitable for the operation of optical transport networks.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
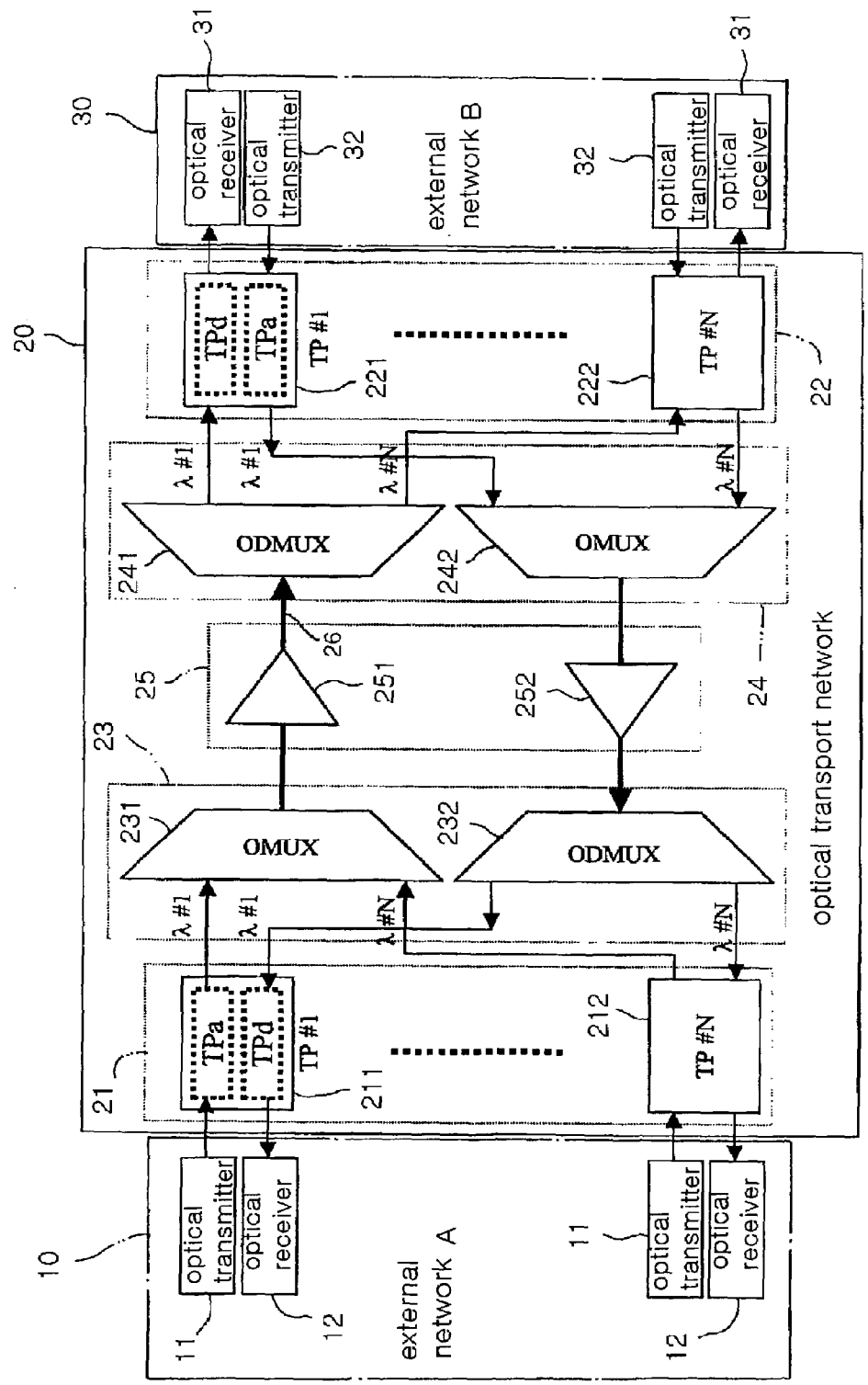
FIG. 1 is a block diagram illustrating an optical transport system using typical optical transponders.
Figure 2:
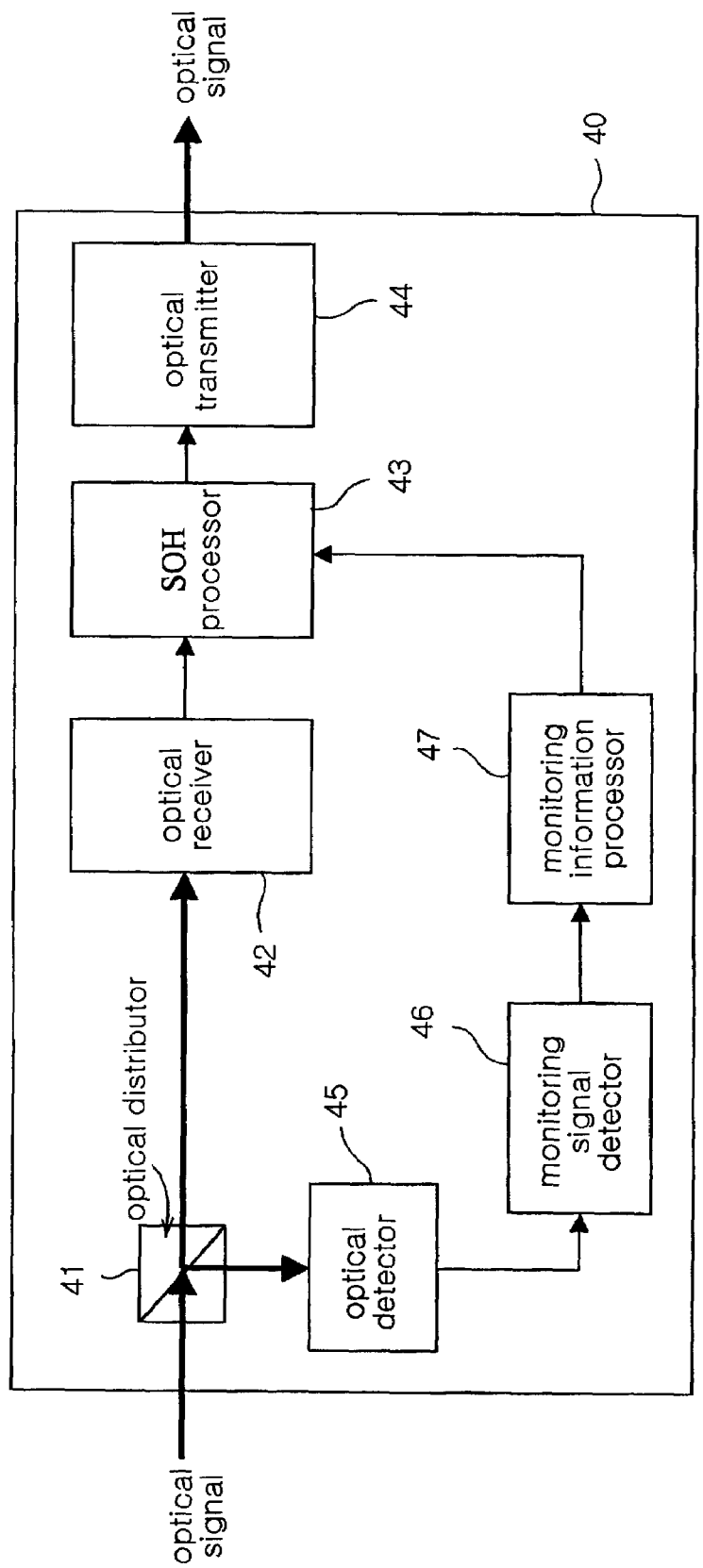
FIG. 2 is a block diagram illustrating an optical transponder used in a conventional optical transport system.
Figure 3:
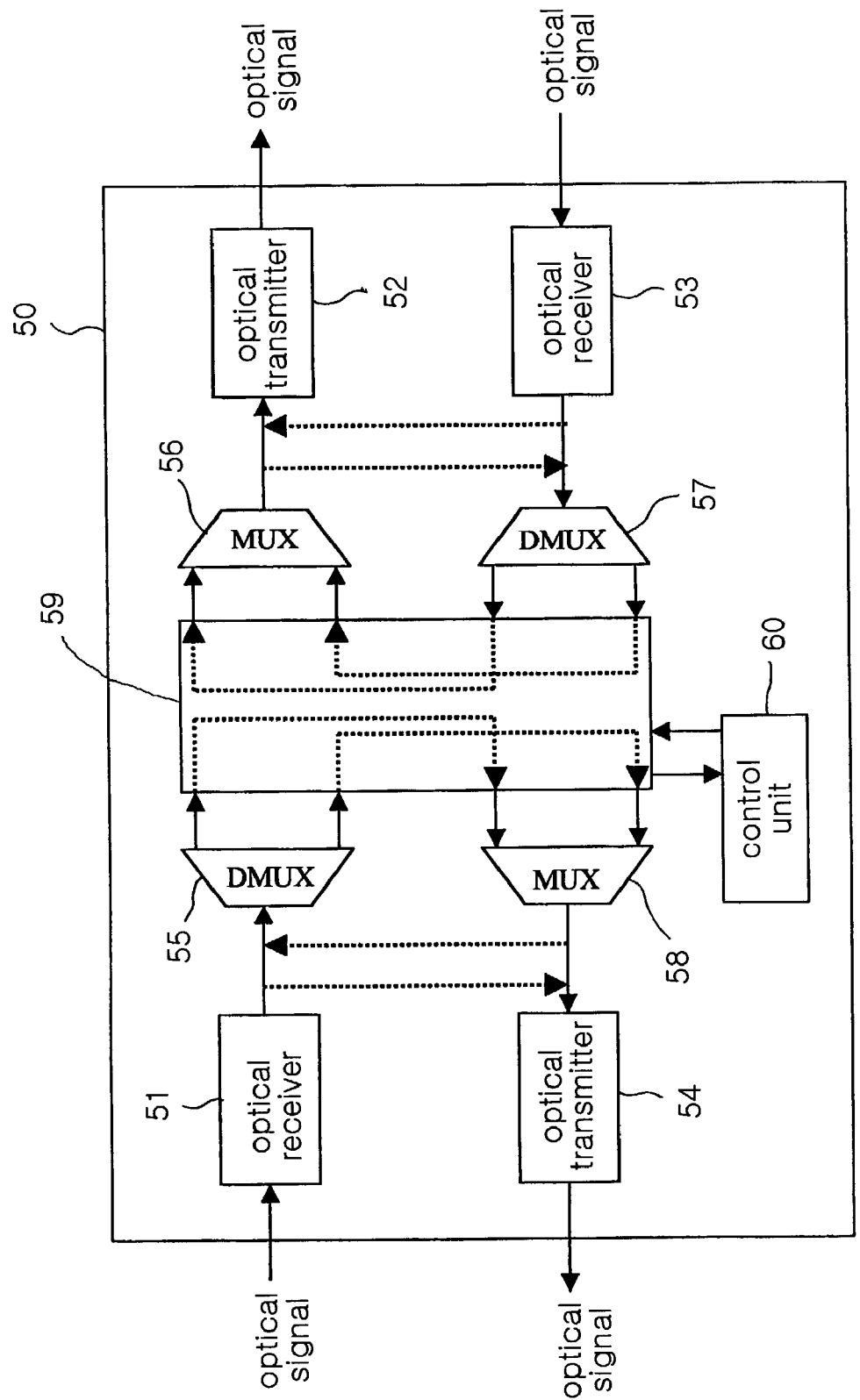
FIG. 3 is a block diagram illustrating an optical transponder with an add/drop operation function of optical channels in accordance with an embodiment of the present invention.

FIG. 3 is a block diagram illustrating an optical transponder with an add/drop operation function of optical channels in accordance with an embodiment of the present invention. The optical transponder according to the illustrated embodiment of the present invention has functions of performing maintenance of optical signals, processing monitoring signals, and correcting errors. As shown in FIG. 3, the optical transponder of the present invention, which is denoted by the reference numeral 50 is configured to perform both the adding and dropping type optical transponder functions. For the adding type optical transponder function, the optical transponder 50 includes an optical receiver 51 for receiving an optical signal from an external network and opto-electrically converting the received optical signal, a demultiplexer 55 for demultiplexing a data signal outputted from the optical receiver 51, a digital wrapper 59 for adding maintenance information, monitoring information, and an error correction symbol to each of the demultiplexed signals, a multiplexer 56 for multiplexing output signals from the digital wrapper 59, and an optical transmitter 52 for receiving the multiplexed signal outputted from the multiplexer 56, electro-optically converting the received multiplexed signal, and transmitting the resultant optical signal to an optical transport network. For the dropping type optical transponder function, the optical transponder 50 includes an optical receiver 53 for receiving an optical signal from an optical transport network, and opto-electrically converting the received optical signal, a demultiplexer 57 for demultiplexing a data signal outputted from the optical receiver 53, the digital wrapper 59 for adding maintenance information, monitoring information, and an error correction symbol to each of the demultiplexed signals outputted from the demultiplexer 57, a multiplexer 58 for multiplexing output signals from the digital wrapper 59, and an optical transmitter 54 for receiving the multiplexed signal outputted from the multiplexer 58, electro-optically converting the received multiplexed signal, and transmitting the resultant optical signal to an external network.

Now, detailed functions and operations of respective constituting elements included in the optical transponder of the present invention will be described. First, the detailed functions of the constituting elements associated with the adding type optical transponder function will be described.

When the optical receiver 51 receives an optical signal from an external network, it opto-electrically converts the received optical signal, and amplifies the resultant electrical signal in accordance with its opto-electrical conversion and amplification functions. The electrical signal amplified by the optical receiver 51 is subjected to a 1:N demultiplexing operation by the demultiplexer 55 arranged downstream from the optical receiver 51. The demultiplexer 55 reproduces a data signal from the electrical signal in accordance with its data/clock reproduction function. The reproduced signal is subjected to the 1:N demultiplexing operation, so that N data signals are generated. The N data signals are transmitted to the digital wrapper 59.

The digital wrapper 59 adds maintenance information, monitoring information, and an error correction symbol to each of the N data signals from the demultiplexer 55, in order to allow the optical transport network to operate maintenance, monitoring and error correction functions for optical signals. In accordance with the addition of the maintenance information, monitoring information, and error correction symbol, an increase in transmission rate occurs. As the transmission rate of the N data signals increases, it is possible to remove the increased noise in the information signal caused by the modulation of maintenance and monitoring information into low frequency components in order to operate the maintenance and monitoring information in the information signal. The multiplexer 56 performs an N:1 multiplexing operation for the N signals transmitted from the digital wrapper 59, and outputs the multiplexed signal to the optical transmitter 52. The optical transmitter 52 electro-optically converts the multiplexed signal outputted from the multiplexer 56, and transmits the converted optical signal to an optical transport network.

The detailed functions of the constituting elements associated with the dropping type optical transponder function will now be described.

When the optical receiver 53 receives an optical signal from an optical transport network, it opto-electrically converts the received optical signal, and amplifies the resultant electrical signal in accordance with its opto-electrical conversion and amplification functions. The electrical signal amplified by the optical receiver 53 is subjected to a 1:N demultiplexing operation by the demultiplexer 57. The demultiplexer 57 reproduces a data signal from the electrical signal in accordance with its data/clock reproduction function. The reproduced signal is subjected to the 1:N demultiplexing operation, so that N data signals are generated. The N data signals are transmitted to the digital wrapper 59.

The digital wrapper 59 detects maintenance information and monitoring information contained in the N data signals from the demultiplexer 55, in order to allow operations of maintenance, monitoring and error correction functions. In accordance with the detection of the maintenance information and monitoring information, a decrease in transmission rate occurs. As the N data signals are decreased in transmission rate, they can have the same transmission rate as information signals in conventional external networks. The multiplexer 58 performs an N:1 multiplexing operation for the N signals transmitted from the digital wrapper 59, and outputs the multiplexed signal to the optical transmitter 54. The optical transmitter 54 electro-optically converts the multiplexed signal outputted from the multiplexer 56, and transmits the converted optical signal to an external network.

The reference numeral 60 denotes a control unit for controlling the operation of the digital wrapper 59. This control unit 60 serves to control functions of adding and dropping maintenance information and monitoring information. Although not shown, the optical transponder further includes a signal transfer unit for receiving the maintenance information and monitoring information detected by the digital wrapper 59, and error detection and correction signals, and transmitting the received information and signals to the control unit. This signal transfer unit also receives maintenance information and monitoring information, and error detection and correction control signals generated from the control unit 60, and transmits the received information and control signals to the digital wrapper 59.

Figure 4:
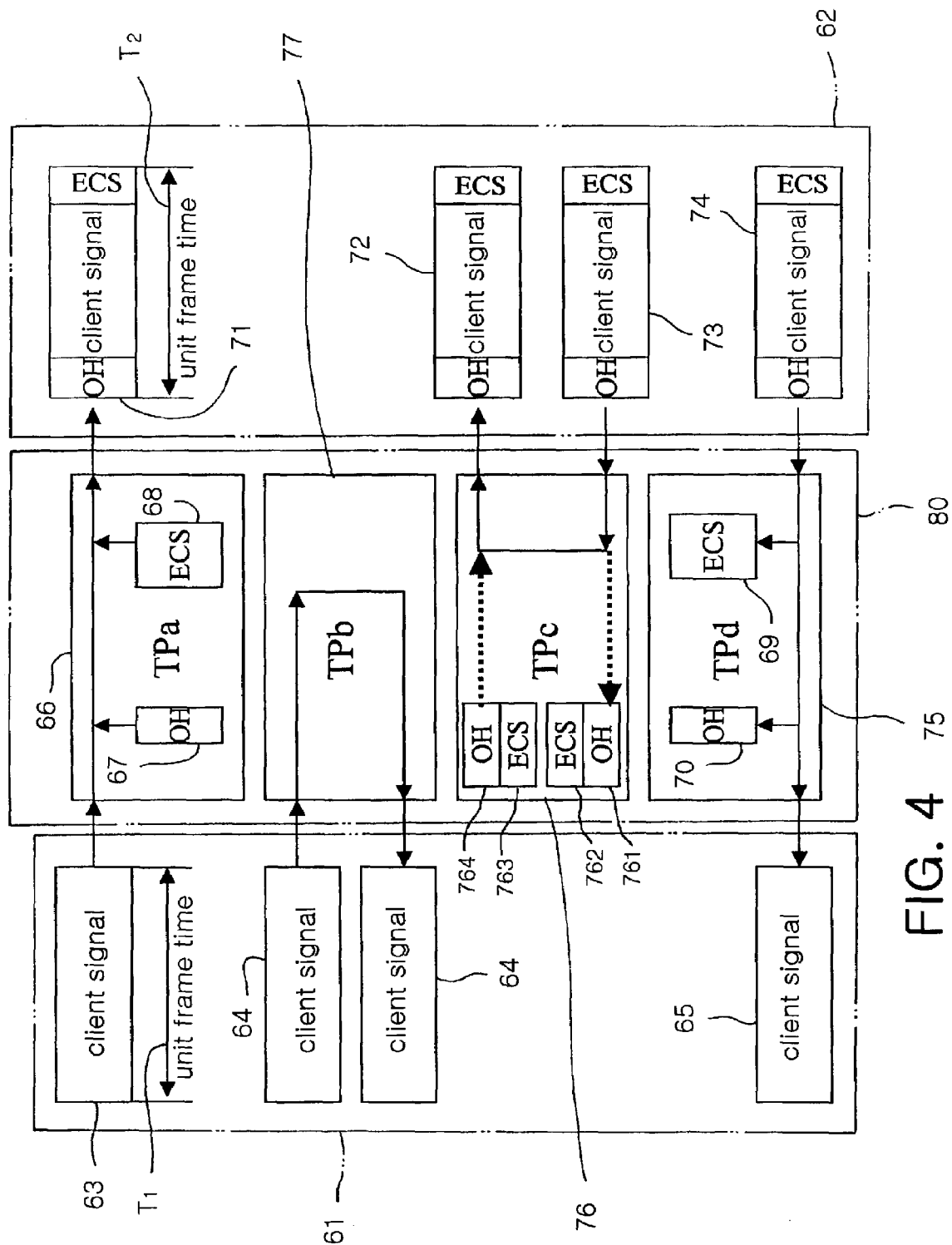
FIG. 4 is a diagram illustrating flows of signals transmitted through the optical transponder according to the illustrated embodiment of the present invention.

FIG. 4 is a diagram illustrating flows of signals transmitted through the optical transponder according to the illustrated embodiment of the present invention. This diagram illustrates transmission of signals according to the signal accessing of an optical transport network to an external network in the case in which the optical transponder 80 having combined adding and dropping functions is used.

As shown in FIG. 4, the optical transponder 80 according to the illustrated embodiment of the present invention performs different optical transponder functions, that is, an optical transponder function corresponding to "TPa" denoted by the reference numeral 66, an optical transponder function corresponding to "TPd" denoted by the reference numeral 75, and optical transponder functions respectively corresponding to "TPb" and "TPc" denoted by the reference numeral 77 and 76. The optical transponder 80 can perform those optical transponder functions simultaneously or selectively.

The optical transponder 66 corresponding to "TPa" performs an optical transponder function for transmitting a client signal 63 from an external network 61 to an optical transport network 62. First, an optical signal 65 from the external network 61 is applied to the optical transponder 66 which, in turn, adds an overhead 67 to the optical signal 65 while adding an error correction symbol (ECS) 68 to the optical signal 65. The unit frame time T1 of the optical signal 63 from the external network 61 should be equal to the unit frame time T2 of an optical signal 71 from the optical transport network 62. In order to make the unit frame times T1 and T2 equal to each other, the optical signal 71 from the optical transport network 62 is shorter than the optical signal 63 from the external network 61 in terms of the time corresponding to one bit (the minimum unit of information). For example, where it is assumed that the signal 63 of the external network 61 consists of 238 bits per frame, and the time taken to transmit one bit is 10.047 ns, a transmission time of 238×10.047 ns is required to transmit 238 bits. Where it is assumed that an error correction symbol of 16 bits and an overhead of one bit are added for error correction and addition of maintenance information and monitoring information, respectively, one frame of the signal 71 generated in the optical transport network 62 consists of 255 bits. In order to obtain the same transmission time as the unit frame time T1 of the external network 61, the unit time of one bit should correspond to 9.3772 ns ((238/255)× 10.047 ns=9.3772 ns). When the unit time of one bit is reduced, the time taken to transmit 238 bits from the external network is 2,391.18 ns (238×10.047 ns=2,391.18 ns), and the time taken to transmit 255 bits from the optical transport network is 2,391.18 ns (255×9.3772 ns=2,391.18 ns). Accordingly, the times taken in both cases are equal. Thus, the 238 bits forming the signal of the external network can be stably transmitted without any transmission delay or signal distortion.

However, the signal 63 from the external network 61 passing through the optical transponder corresponding to "TPa" performing the adding type optical transponder function should pass through the optical transponder corresponding to "TPd" performing the dropping type optical transponder function. The optical transponder 75 corresponding to "TPd" performs an optical transponder function for transmitting a client signal 74 from the optical transport network 62 to the external network 61. In order to recover the signal transmission rate of the optical signal to be transmitted to the external network 61, it is necessary to drop N bits of the added error correction symbol and one bit of the added overhead for the maintenance information and monitoring information. The error correction symbol is used to correct errors. Using the error correction symbol, errors of information bits occurring in an optical transmission operation are discriminated so that they are corrected. Also, the overhead is dropped so that it is used for maintenance and monitoring operations. The optical transponder 75 corresponding to "TPd" is used at a signal termination point for the client signal 74 transmitted from the optical transport network 62. The optical transponder 75 performs a function for recovering a signal frame suitable for the signal 62 from the external network 61, so as to achieve a signal accessing to the external network 61. The function of the optical transponder 75 corresponding to "TPd" is carried out in a fashion reverse to that of the optical transponder 66 corresponding to "TPa". Accordingly, no further description will be given for the function of the optical transponder 75.

The optical transponder 77 corresponding to "TPb" performs a transponder function for sending an optical signal 64 received from the external network 61 to the external network 61 or transmitting the optical signal 64 to another external network. The optical transponder 77 corresponding to "TPb" does not transmit the optical signal 64 received from the external network 61 to the optical transport network 62, but feeds back the optical signal 64 to the external network 61.

The optical transponder 76 corresponding to "TPc" performs a transponder function for transmitting an optical signal 73 received from the optical transport network 62 to another optical transport network. In order to transmit the optical signal 73 to another optical transport network, it is necessary to drop N bits of the added error correction symbol and one bit of the added overhead for the maintenance information and monitoring information. The error correction symbol is used to correct errors. Using the error correction symbol, errors of information bits occurring in an optical transmission operation are discriminated so that they are corrected. Also, the overhead is dropped so that it is used for maintenance and monitoring operations. A new error correction symbol 763 and a new overhead 764 are added so that they are also transmitted to the other optical transport network. Alternatively, the N bits of the previously added error correction symbol 762 and the one bit of the previously added overhead 761 may be transmitted as they are, without being dropped.

Figure 5:
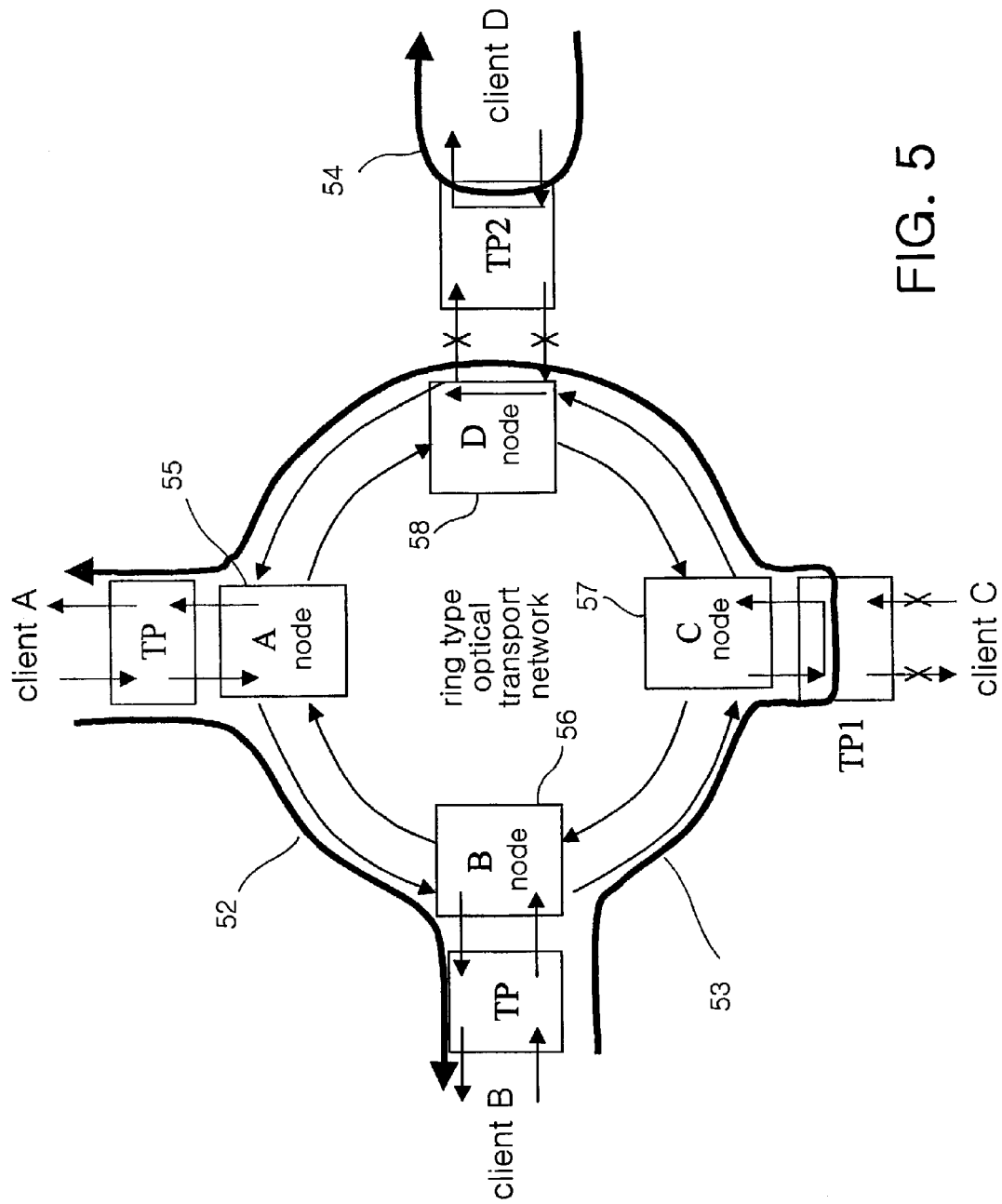
FIG. 5 is a diagram illustrating operating functions of a network to which the optical transponder according to the illustrated embodiment of the present invention is applied.

FIG. 5 is a diagram illustrating operating functions of a network to which the optical transponder according to the illustrated embodiment of the present invention is applied. FIG. 5 shows the configuration of a ring type optical transport network to which the optical transponder function of the present invention is applied.

Referring to FIG. 5, four nodes, that is, an A-node 55, a B-node 56, a C-node 57, and a D-node 58, are illustrated. Each of the nodes is an add/drop multiplexing node. An optical transponder for adding and dropping optical signals is formed at each node. Where it is desired to transmit an optical signal from a client A to a client B, the optical transponder adapted to connect the clients A and B should perform both the adding and dropping functions. Accordingly, this optical transponder should have both the function of the optical transponder 66 corresponding to "TPa" of FIG. 4 and the function of the optical transponder 75 corresponding to "TPd" of FIG. 4. Meanwhile, the optical transponder for connecting the client B and the B-node 56 should have both the function of the optical transponder 66 corresponding to "TPa" of FIG. 4 and the function of the optical transponder 75 corresponding to "TPd" of FIG. 4 because it has to perform both the adding and dropping functions.

Also, the C-node 57 has to perform an optical transponder function for connecting optical transport networks, in order to connect the B and D-nodes 56 and 58. Accordingly, the C-node 57 should have the function of the optical transponder 76 corresponding to "TPc" of FIG. 4. In order to directly connect the C-node 57 to the A-node 55 without using any optical transponder, the D-node 58 is connected to those nodes 55 and 57 only by optical fibers. Accordingly, the optical transponder corresponding to "TP2" for the connection to the D-node 58 should have the function of the optical transponder 77 corresponding to "TPb" of FIG. 4. In order to achieve the optical transponder function associated with each node, the optical transponder of the present invention can adaptively perform a desired function.

As apparent from the above description, the present invention provides an optical transponder with an add/drop operation function of optical channels, which combines operating functions of adding and dropping type optical transponders, thereby being capable of effectively performing maintenance and monitoring operations for optical signals being transmitted, adaptively coping with the configuration of an optical transport system, to which the optical transponder is applied, and achieving an improvement in transmission performance.

In accordance with the present invention, maintenance and monitoring information, which are added in an information signal for maintenance and monitoring operations, have the same signal form as that of the information signal. Accordingly, it is possible to avoid generation of noise caused by a modulation of maintenance and monitoring information into low frequency components. Furthermore, it is possible to recover errors generated during an optical transmission operation in accordance with addition of an error correction symbol.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus comprising:
    an optical transponder, the optical transponder including:
        at least one opto-electrical converting means for receiving optical signal as an input optical signal, and converting the received optical signal into a electrical signal;
        at least one demultiplexing means for demultiplexing the converted electrical signal;
        information adding means for adding maintenance information, monitoring information, and error correction information to each of demultiplexed signals outputted from the demultiplexing means;
        detecting and correcting means for receiving the demultiplexed signals from the demultiplexing means, detecting the maintenance information, monitoring information, and errors contained in each of the demultiplexed signals, and correcting the detected errors;
        at least one multiplexing means for receiving and multiplexing signals respectively outputted from the information adding means and the detecting and correcting means;
        at least one optical transmitting means for transmitting a signal outputted from the multiplexing means as an output signal; and
        control means for generating a control signal for processing of the maintenance information and monitoring information, and correction of errors, applying the control signal to the detecting and correcting means, receiving the maintenance information, monitoring information, and error correction information from the detecting and correcting means, and signal-processing the received information,
    wherein the optical transponder operates to perform add/drop operation functions of optical channels in an optical transport system connecting an external network and an optical transport network.

2. The apparatus according to claim 1, the optical transponder further comprising:
    signal transfer means for receiving the maintenance information and monitoring information detected by the detecting and correcting means, transferring the received information to the control means, receiving the control signal generated from the control means in association with the maintenance information and monitoring information, and transferring the received control signal to the detecting and correcting means.

3. The apparatus according to claim 1, wherein the input and output optical signals have the same unit frame time.

4. The apparatus according to claim 1, wherein the optical transponder adds an overhead (OH) for the maintenance information and monitoring information, and adds an error correction symbol (ECS) for the error correction information.

5. The apparatus according to claim 1, wherein the optical transponder is used at a signal termination point of a signal transmitted from the optical transport network, and recovers a signal frame suitable for a signal from the external network so as to achieve a signal accessing to the external network.

6. The apparatus according to claim 1, wherein the optical transponder feeds back an optical signal transmitted from an external network to said external network, or transfers the optical signal to another external network.

7. The apparatus according to claim 1, wherein the optical transponder transfers an optical signal transmitted from an optical transport network to another optical transport network.

* * * * *